United States Patent
Back

[11] 3,876,290
[45] Apr. 8, 1975

[54] RAPID FOCUSING VARIFOCAL LENS ASSEMBLY

[76] Inventor: Frank G. Back, Front Creek Dr., Locust Valley, N.Y. 11560

[22] Filed: Dec. 5, 1973

[21] Appl. No.: 421,756

[52] U.S. Cl. .............................. 350/187; 350/184
[51] Int. Cl. ........................................... G02b 15/00
[58] Field of Search................... 350/184, 186, 187

[56] References Cited
UNITED STATES PATENTS

| | | | |
|---|---|---|---|
| 3,663,093 | 5/1972 | Iida | 350/187 |
| 3,765,748 | 10/1973 | Mito | 350/187 |
| 3,784,285 | 1/1974 | Watanabe | 350/186 |

*Primary Examiner*—Ronald L. Wibert
*Assistant Examiner*—Conrad Clark

[57] ABSTRACT

The movable elements of a varifocal lens assembly are shifted from the wide angle to the telephoto position by the rotation of the outer barrel of the assembly. Rapid focusing is achieved by longitudinal motion of the same barrel. A novel optical system makes it possible to carry out the functions of the lens assembly with these most practical and convenient motions and without the need for fine focusing.

9 Claims, 5 Drawing Figures

3,876,290

RAPID FOCUSING VARIFOCAL LENS ASSEMBLY

BACKGROUND OF THE INVENTION

Varifocal lens assemblies in which several fixed and movable lenses are shifted along a common optical axis to change the focal length of the system are well-known. Movement of the lens elements has been accomplished by sliding the outer barrel or housing of the lens assembly longitudinally until the desired focal length was reached. Focusing was performed by rotating the same barrel or the front lens. Such prior art lens systems, however, do not lend themselves to very rapid manipulation such as is necessary for photographing sporting events. Fine focusing which involves careful setting of the front lens is required.

Accordingly, it is an object of the present invention to provide a varifocal lens assembly which is capable of rapid focusing during use.

Another object of the present invention is to provide a varifocal lens assembly which lends itself to natural hand motions.

Still another object of the present invention is to provide a varifocal lens assembly which does not need fine focusing to produce sharp images.

SUMMARY

In the present invention, there are shown varifocal lens assemblies in which the front lens is used for focusing and is transported along the optical axis of the lens assembly by means of an outer housing which is shifted longitudinally of the assembly. The front lens has a large movement and fine focusing is thereby eliminated.

The movable lens elements employed for changing the focal length of the lens system are operated by rotating the housing of the lens assembly. This moves the front lens assembly and the variator assembly.

Novel optical systems are disclosed for the assembly which also reduce vignetting, commonly found in prior art varifocal lens assemblies.

DESCRIPTION OF THE DRAWINGS

In the accompanying drawings forming a part hereof, corresponding parts have been given identical reference numerals, in which drawings.

GENERAL DESCRIPTION

Figure 1:
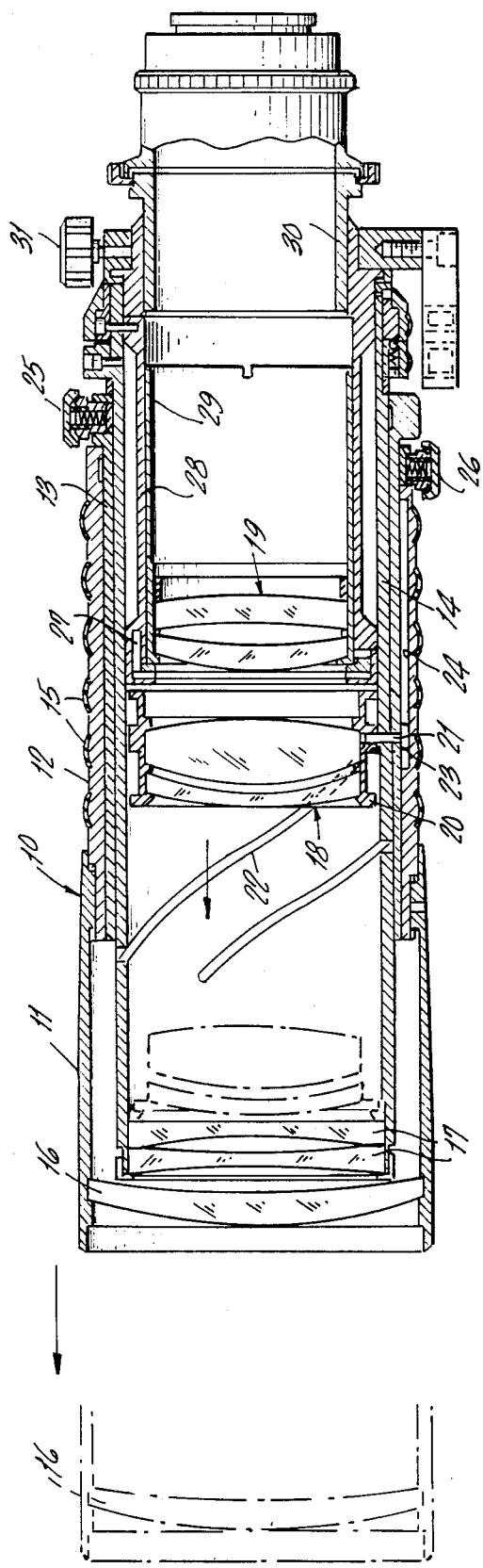
FIG. 1 is a view in side elevation partially broken away showing a varifocal lens assembly according to the present invention.

Referring to the drawings and particularly FIG. 1, there is shown a rapid focusing varifocal lens assembly carried within a housing 10. The housing 10 is formed of a longitudinally slidable sleeve 11 and a hollow cylindrical control member 12. The control member may be rotated with a hollow tubular support 13 or slid longitudinally with the support. Annular resilient friction strips 15 are carried by the control member 12 for a hereinafter more fully described purpose.

A front lens 16 having a relatively long travel (of the order of 65 mm in one embodiment of the invention) is carried by the sleeve 11. The front lens 16 is used for rapid focusing in the present invention and its long travel eliminates the need for fine focusing customary in varifocal camera lenses. In following rapid action, the operator of the present lens assembly can focus quickly and accurately by sliding the control member 12 back, and forth until sharp focus is reached. The longitudinal sliding motion does not disturb the position of the lens with respect to the object being viewed as would the rotating motion required of prior art devices. This result is particularly true of hand held camera operations.

The varifocal lens elements (best shown in FIG. 2) are carried within a barrel 14 and comprise a variator front lens 16, a first fixed group of lenses 17, hereinafter called an erector, an axially slidable group of lenses 18 hereinafter called a compensator and a fixed group of lenses 19 comprising a relay. The slidable compensator lenses 18 are carried within a ring 20 having an outwardly extending pin 21 which passes through the barrel 14 and tubular support 13. The pin 21 rides within a helical slot 22 in the inner barrel 14 of the lens assembly 10. The end 23 of the pin 21 is freely slidable within an elongated groove 24 in the inner wall of the control member 12.

As the control member 12 is rotated, the pin 21 is slid along the helical groove 22 causing the compensator to travel within the barrel 14 to the desired position. The control member 12 may then be shifted longitudinally to focus the front lens 16. Both functions may be carried out without removing the hand of the operator from the control member.

An adjustable friction brake 25 is carried upon the tubular support to control the amount of effort necessary to rotate the control member and to prevent accidental movement of the front lens 16 and compensator 18. The brake 25 bears against the outer surface of the barrel 14 and is in frictional contact therewith. A second adjustable friction brake 26 is carried by the control member 12 and bears against the outer surface of the tubular support 13. This brake controls the amount of effort necessary to slide the housing longitudinally for focusing.

The iris 27 of the varifocal lens assembly is positioned between the compensator 18 and the relay 19 and is secured to the relay 19 in a fixed position within the housing. An elongated ring 29 secures the relay within the relay barrel 29.

The varifocal lens assembly is secured to the camera (not shown) by means of an adaptor 30 coupled to the relay barrel 28 at the exit end thereof. A threaded screw 31 in the housing 10 adjusts the position of the varifocal lens on the camera.

Figure 2:
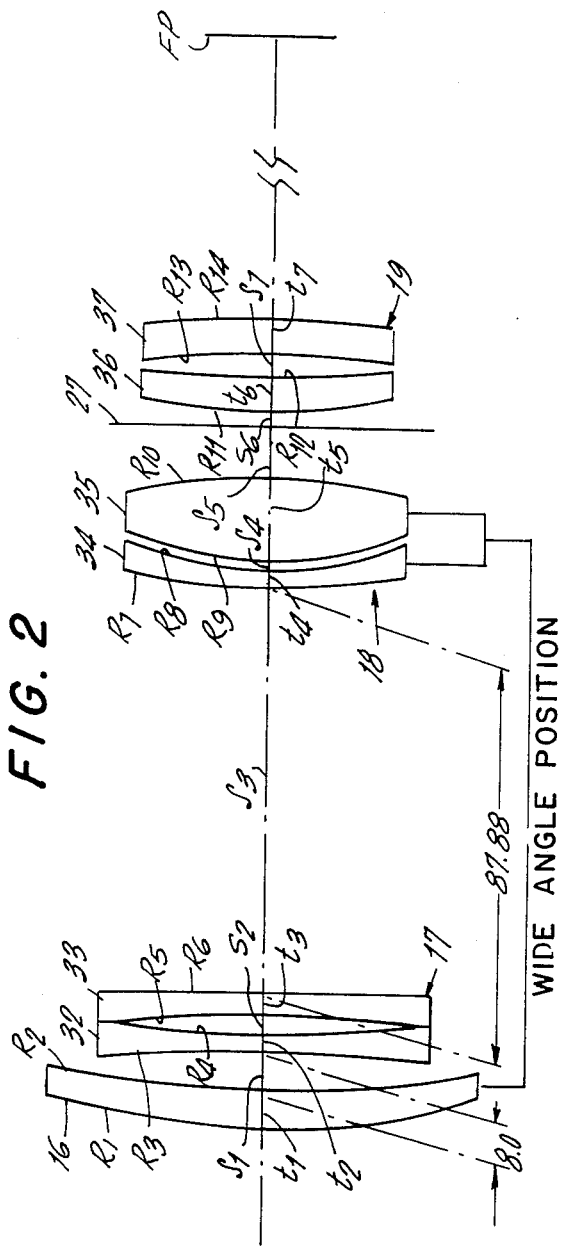
FIG. 2 is a somewhat diagrammatic view of the lens elements shown in FIG. 1 in the wide angle position.
Figure 3:
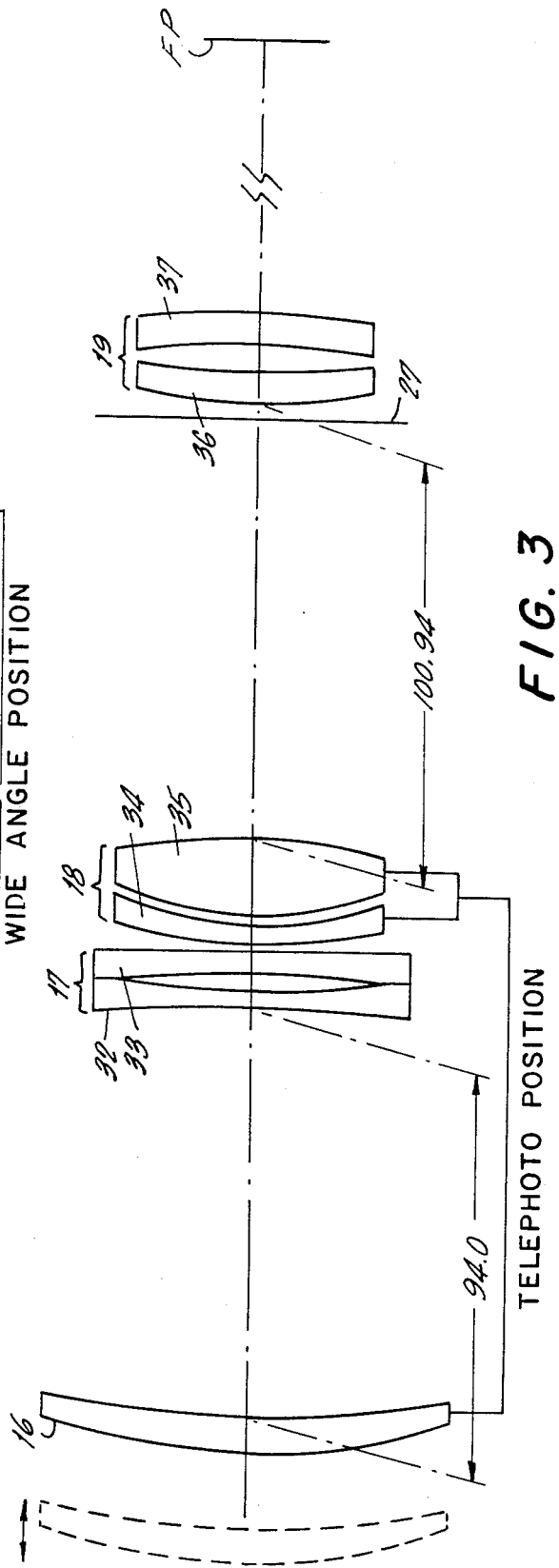
FIG. 3 is a view similar to FIG. 2 in the telephoto position.

Referring to FIGS. 2 and 3, there is shown the lens elements of one form of the present invention. In this embodiment, the front lens 16 is followed by the erector 17 comprising a first and second negative lens 32, 33. The compensator 18 consists of a negative lens 34 and a positive lens 35. The relay 19 is made up of two air spaced negative lenses 36, 37.

The following table gives the optical characteristics of the system shown in FIGS. 2 and 3 and described above for the wide angle position.

TABLE I

| LENS NO. | RADIUS R. (in mm) | THICKNESS (t) AIR SPACING (s) | GLASS CAT. REF. | INDEX OF REF., ND | DISPERSION V |
|---|---|---|---|---|---|
| FRONT LENS (Variator) | | | | | |
| 16 | $R_1=+163.240$ | $t_1=9.0$ | LAF-2 | 1.7440 | 44.90 |
|  | $R_2=-286.390$ | | | | |
| ERECTOR | | $s_1=8.0$ | | | |
| 32 | $R_3=-351.269$ | $t_2=4.0$ | $K_2F$-2 | 1.5294 | 51.8 |
|  | $R_4=-464.389$ | | | | |
|  |  | $s_2=5.0$ | | | |
| 33 | $R_5=-167.870$ | $t_3=4.0$ | $K_2F$-2 | 1.5294 | 51.8 |
|  | $R_6=+3159.559$ | | | | |
|  |  | $s_3=87.88$ | | | |
| COMPENSATOR | | | | | |
| 34 | $R_7=+171.879$ | $t_4=2.8$ | SF-8 | 1.6889 | 31.143 |
|  | $R_8=-82.509$ | | | | |
|  |  | $s_4=2.8$ | | | |
| 35 | $R_9=+87.139$ | $t_5=17.76$ | BK-7 | 1.5168 | 64.19 |
|  | $R_{10}=+169.260$ | | | | |
| IRIS | | $s_5=10.98$ | | | |
|  | | $s_6=4.0$ | | | |
| RELAY | | | | | |
| 36 | $R_{11}=+145.809$ | $t_6=8.0$ | SK-16 | 1.6204 | 60.292 |
|  | $R_{12}=-336.400$ | | | | |
|  |  | $s_7=8.0$ | | | |
| 37 | $R_{13}=-394.769$ | $t_7=8.0$ | F-2 | 1.620 | 36.342 |
|  | $R_{14}=+403.100$ | | | | |

Figure 4:
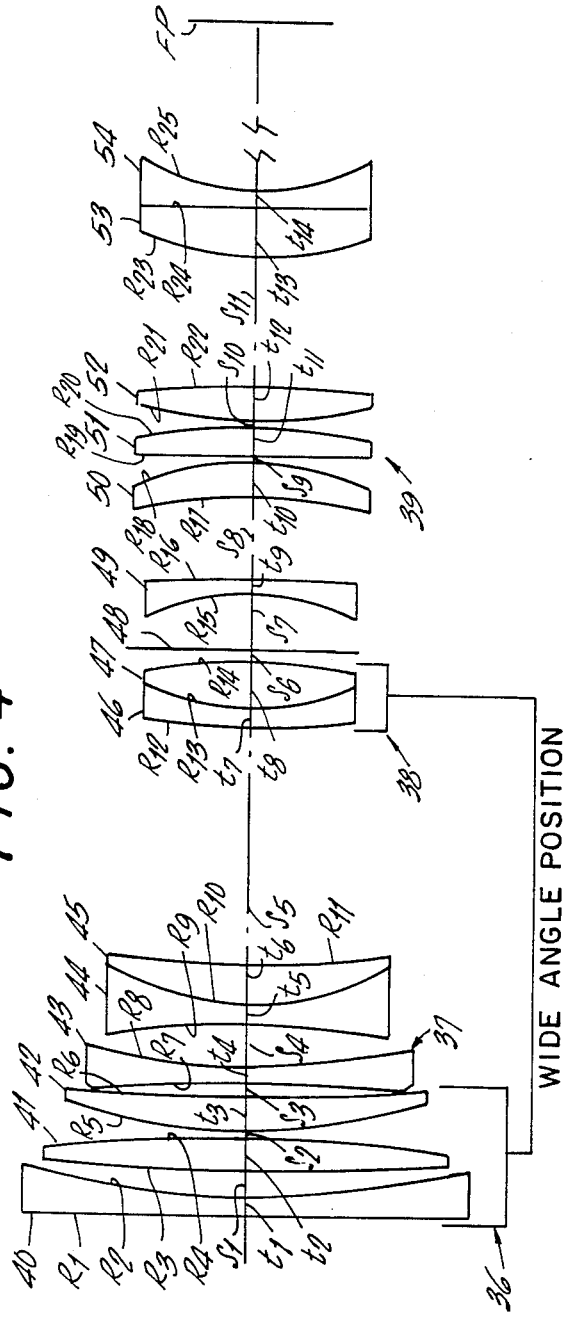
FIG. 4 is a somewhat diagrammatic view of the lens elements of a varifocal lens assembly comprising a second embodiment of the present invention shown in the wide angle position.
Figure 5:
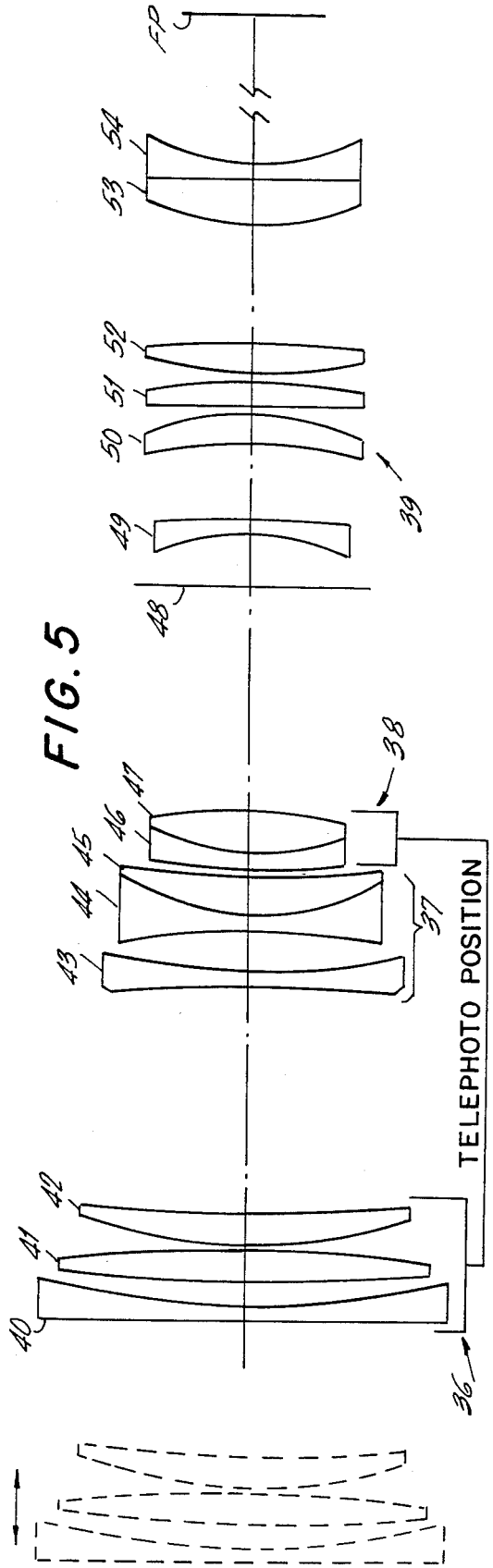
FIG. 5 is a view similar to FIG. 4 in the telephoto position.

In the above table, the symbols designate the following:

ND is the refractive index for sodium D lines.
V is the dispersion number
LAF stands for Lathanum Flint
$K_2F$ stands for Kurz Flint
SF stands for Dense Flint
BK stands for Borosilicate Crown
SK stands for Dense Crown
F stands for Flint
$R_1$ to $R_{14}$ are the respective radii of refractive lens surfaces numbered from front to rear of the lens system.
$t_1$ to $t_7$ are the respective axial thicknesses.
$s_1$ to $s_7$ are the respective separations between the lens elements.
Equivalent focal length of the whole system= (EFL)=f=172-320 mm
Back focal length of the whole system = 202.84
Radius, thickness and separation in millimeters.
Referring to FIGS. 4 and 5, there is shown the lens elements for a second embodiment of the present invention, it being understood that the mechanism for focusing the front lens and transporting the variator and compensator are the same as hereinabove described in connection with FIG. 1. The lens groups in this embodiment comprise a combined front lens and variator group 36, an erector lens group 37, an axially slidable compensator group 38 and a relay 39.

The front lens group is slidable along the optical axis of the system and consists of a negative lens 40 and two positive lenses 41, 42. The erector is made up of a negative lens 43 and a cemented doublet 44, 45. The axially slidable compensator 38 consists of a cemented doublet 46, 47 of positive power. The relay which follows the iris stop 48 comprises in the order of the entrant light beam, a negative lens 49, a negative and two positive lenses 50, 51, 52 and a cemented doublet 53, 54.

The following table gives the optical characteristics of the system shown in FIGS. 4 and 5 and described above.

TABLE II

| LENS NO. | RADIUS R (in mm) | THICKNESS (t) AIR SPACING (s) | GLASS CAT. REF. | INDEX OF REF. ND | DISPERSION V |
|---|---|---|---|---|---|
| FRONT LENS (Variator) | | | | | |
| 40 | $R_1=-3159.56$ | $t_1=3.0$ | SF-8 | 1.6889 | 31.143 |
|  | $R_2=-193.61$ | | | | |
|  |  | $s_1=6.0$ | | | |
| 41 | $R_3=+765.38$ | $t_2=7.0$ | SK-16 | 1.6204 | 60.33 |
|  | $R_4=+226.82$ | | | | |
|  |  | $s_2=1.0$ | | | |
| 42 | $R_5=+114.22$ | $t_3=8.5$ | SK-16 | 1.6204 | 60.33 |
|  | $R_6=-765.38$ | | | | |
|  |  | $s_3=1.0$ | | | |

TABLE II – Continued

| LENS NO. | RADIUS R (in mm) | THICKNESS (t) AIR SPACING (s) | GLASS CAT. REF. | INDEX OF REF. ND | DISPERSION V |
|---|---|---|---|---|---|
| ERECTOR | | | | | |
| 43 | $R_7$=Plano | $t_4$=4.0 | LAK-10 | 1.7199 | 50.3 |
| | $R_8$=133.39 | | | | |
| | | $s_4$=8.5 | | | |
| 44 | $R_9$=−187.31 | $t_5$=3.6 | LAK-10 | 1.7199 | 50.3 |
| | $R_{10}$=±54.09 | | | | |
| 45 | $R_{11}$=−286.34 | $t_6$=9.0 | SF-18 | 1.7215 | 29.3 |
| COMPENSATOR | | $s_5$=48.5 | | | |
| 46 | $R_{12}$=+220.05 | $t_7$=4.0 | F-2 | 1.6200 | 36.2 |
| | $R_{13}$=±49.94 | | | | |
| 47 | | $t_8$=10.0 | SK-16 | 1.6204 | 60.33 |
| | $R_{14}$=+117.98 | | | | |
| IRIS | | $s_6$=2.5 | | | |
| RELAY | | $s_7$=11.0 | | | |
| 49 | $R_{15}$=−43.40 | $t_9$=3.0 | LAK-10 | 1.7199 | 50.3 |
| | $R_{16}$=+449.54 | | | | |
| | | $s_8$=17.5 | | | |
| 50 | $R_{17}$=−136.10 | $t_{10}$=7.4 | SK-16 | 1.6204 | 60.32 |
| | $R_{18}$=+55.74 | | | | |
| | | $s_9$=1.0 | | | |
| 51 | $R_{19}$=Plano | $t_{11}$=6.0 | SK-16 | 1.6204 | 60.33 |
| | $R_{20}$=+127.58 | | | | |
| | | $s_{10}$=1.0 | | | |
| 52 | $R_{21}$=+108.09 | $t_{12}$=6.8 | SK-16 | 1.6204 | 60.33 |
| | $R_{22}$=+462.88 | | | | |
| | | $s_{11}$=27.0 | | | |
| 54 | $R_{23}$=+76.26 | | | | |
| | $R_{24}$=±336.90 | $t_{13}$=10.0 | SK-16 | 1.6204 | 60.33 |
| | $R_{25}$=−48.42 | $t_{14}$=3.12 | SK-18 | 1.7215 | 29.3 |

In the above table, the symbols designate the following:

ND is the refractive index for sodium D lines
V is the dispersion number
LAK stands for Lathanum Crown
F stands for Flint
SK stands for Dense Crown
SF stands for Dense Flint
$R_1$ to $R_{25}$ are the respective radii of refractive lens surfaces numbered from front to rear of the lens system.
$t_1$ to $t_{14}$ are the respective axial thicknesses,
$s_1$ to $s_{18}$ are the respective separations from the front to the rear of the lens system.
Equivalent focal length of the whole system= (EFL)=f=85-170 mm
Back focal length of the whole system=86.0
Travel of the front lens variator=48.5 mm.
Radius, Thickness, and separation in millimeters.

From the foregoing, it will be seen that there has been provided a rapid focus varifocal lens assembly which lends itself to fast operation in the field without the time-consuming fine focusing operation of prior art lenses. The longitudinal focusing movement and the long front lens variator travel are easily carried out while watching the object being viewed. The rotation of the control barrel is rapid and accurate.

Having thus fully described the invention, what is sought to be secured by letters patent is:

I claim:

1. A rapid focus varifocal lens assembly comprising a rotatable and longitudinally slidable outer housing, a varifocal lens system within said housing, including fixed and movable lens elements to vary the focal length of the lens system, a front lens for the varifocal lens system, means including the longitudinal sliding action of the outer housing to move the front lens to focus the lens assembly, and means including the rotary motion of the outer housing to move the varifocical lens elements to vary the focal length of the lens assembly.

2. A lens assembly according to claim 1 in which the outer housing is carried upon a tubular support, an elongated slot is provided in the inner wall of the outer housing parallel to the optical axis of the system, and a pin slidably carried in the slot extends inwardly and engages a movable element of the varifocal system to shift the said movable element in response to the rotational movement of the outer housing.

3. A lens assembly according to claim 1 in which the outer housing comprises a control member and a sleeve coupled to each other, and the front lens is carried by the sleeve.

4. A lens assembly according to claim 2 in which the moveable and fixed lens elements of the varifocal lens are carried within an inner barrel having a helical slot therein to receive the pin therethrough.

5. A lens assembly according to claim 4 in which a first brake member carried by the tubular support is in frictional contact with the outer surface of the inner barrel to control the rotary movement of the outer housing, and a second brake member carried by the outer housing is in frictional contact with the outer surface of the tubular support to control the longitudinal movement of the outer housing.

6. A lens assembly according to claim 1 in which the front lens has a travel of the order of 65 mm.

7. A lens assembly according to claim 1 in which the lens elements in the order of the incident light beam comprise a front lens variator, an erector, a compensator and a ralay; said front lens variator and compensator being movable with respect to the other lens elements of the system.

8. A lens assemble according to claim 1 in which the varifocal lens system within the housing comprises, in the order of the direction of the incident light, a front lens axially slidable with respect to the fixed lenses within the system, a stationary erector, an axially slidable air spaced compensator, an aperture stop spaced from the compensator, and a rear section of fixed focal length including a relay having two elements therein, said lens system having optical characteristics of the following order wherein:

ND is the refractive index for the D line,
V is the dispersion number,
LAF stands for Lathanum Flint,
K₂F stands for Kurz Flint,
SF stands for Dense Flint,
BK stands for Borosilicate Crown
SK stands for Dense Crown
F stands for Crown,
$R_1$ to $R_{14}$ are the respective radii of the refractive lens surfaces numbered from front to rear of the lens system.
$t_1$ to $t_7$ are the respective axial thicknesses
$s_1$ to $s_7$ are the respective separations from the front to the rear of the lens system.
Equivalent focal length of the whole system, (EFL)=f=172-320 mm,
Back focal length of the system=202.84 mm,
Radius, thickness and separation in millimeters.

9. A lens assembly according to claim 1 in which the varifocal lens system within the housing comprises, in the order of the direction of the incident light, a front variator lens assembly axially slidable with respect to the fixed lenses within the system, a stationary erector, an axially slidable air spaced compensator, an aperture stop spaced from the compensator, and a rear section of fixed focal length including a relay having six elements therein, said lens system having optical characteristics of the following order wherein ND is the refractive index for the D line, V is the dispersion number, LAF stands for Lathanum Crown
F stands for Flint
SF stands for Dense Flint
SK stands for Dense Crown
$R_1$ to $R_{25}$ are the respective radii of refractive lens surfaces numbered from fron to rear of the lens system.
$t_1$ to $t_{14}$ are the respective axial thicknesses.
$s_1$ to $s_{18}$ are the respective separations from the front to the rear of the lens system.
Equivalent focal length of the whole system (EFL)=f=80-170 mm
Back focal length of the whole system =+86.0 mm
Travel of the front lens variator =+48.5 mm
Radii, thicknesses and separations in millimeters.

* * * * *